(12) United States Patent
Suyama et al.

(10) Patent No.: US 10,895,320 B2
(45) Date of Patent: Jan. 19, 2021

(54) VEHICLE DRIVE DEVICE

(71) Applicant: AISIN AW CO., LTD., Anjo (JP)

(72) Inventors: Daiki Suyama, Okazaki (JP); Natsuki Sada, Anjo (JP); Jun Suzuki, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/645,636

(22) PCT Filed: Nov. 16, 2018

(86) PCT No.: PCT/JP2018/042455
§ 371 (c)(1),
(2) Date: Mar. 9, 2020

(87) PCT Pub. No.: WO2019/098322
PCT Pub. Date: May 23, 2019

(65) Prior Publication Data
US 2020/0284338 A1  Sep. 10, 2020

(30) Foreign Application Priority Data

Nov. 17, 2017  (JP) ................................ 2017-222308

(51) Int. Cl.
*F16H 57/04* (2010.01)
*B60K 7/00* (2006.01)
(Continued)

(52) U.S. Cl.
CPC ....... *F16H 57/0476* (2013.01); *B60K 7/0007* (2013.01); *B60K 17/046* (2013.01);
(Continued)

(58) Field of Classification Search
CPC ... B60K 7/0007; B60K 17/046; F16H 57/043; F16H 57/0482
See application file for complete search history.

(56) References Cited

U.S. PATENT DOCUMENTS 9,421,854 B2 * 8/2016 Okuda ................ B60K 6/48
2012/0015772 A1  1/2012 Kira et al.
(Continued)

FOREIGN PATENT DOCUMENTS

| EP | 3078534 A1 | 10/2016 |
|---|---|---|
| JP | 2013-52867 A | 3/2013 |
| JP | 2017-141889 A | 8/2017 |

OTHER PUBLICATIONS

Feb. 19, 2019 International Search Report issued in International Patent Application No. PCT/JP2018/042455.
(Continued)

*Primary Examiner* — Derek D Knight
(74) *Attorney, Agent, or Firm* — Oliff PLC

(57) ABSTRACT

A vehicle drive device including: a first rotary electric machine; a second rotary electric machine; a first coupler drivingly coupled to a first wheel; a second coupler drivingly coupled to a second wheel; a transmission device that transmits torque of the first rotary electric machine to at least the first coupler out of the first coupler and the second coupler, and transmits torque of the second rotary electric machine to at least the second coupler out of the first coupler and the second coupler; and a case that accommodates the first rotary electric machine, the second rotary electric machine, the first coupler, the second coupler, and the transmission device.

12 Claims, 3 Drawing Sheets

(51) Int. Cl.
  *B60K 17/04* (2006.01)
  *B60K 17/24* (2006.01)
  *F16H 57/02* (2012.01)
  *H02K 5/20* (2006.01)
  *H02K 9/19* (2006.01)

(52) U.S. Cl.
  CPC ............ *B60K 17/24* (2013.01); *F16H 57/02* (2013.01); *F16H 57/043* (2013.01); *F16H 57/0482* (2013.01); *H02K 5/20* (2013.01); *H02K 9/19* (2013.01); *F16H 2057/02034* (2013.01)

(56) References Cited

U.S. PATENT DOCUMENTS

| | | |
|---|---|---|
| 2014/0080649 A1 | 3/2014 | Kira et al. |
| 2014/0080665 A1 | 3/2014 | Kira et al. |
| 2014/0097060 A1* | 4/2014 | Hoshinoya ............... B60K 6/52 192/85.61 |
| 2015/0239332 A1* | 8/2015 | Okuda .................... B60K 6/26 60/716 |
| 2017/0320382 A1 | 11/2017 | Milton et al. |

OTHER PUBLICATIONS

Oct. 5, 2020 Search Report issued in European Patent Application No. 18878107.4.

\* cited by examiner

[図4]

VEHICLE DRIVE DEVICE

BACKGROUND

The present disclosure relates to a vehicle drive device.

A known vehicle drive device includes: a first rotary electric machine; a second rotary electric machine; a first coupling member drivingly coupled to a first wheel; a second coupling member drivingly coupled to a second wheel; and a transmission device that transmits torque of the first rotary electric machine to at least the first coupling member out of the first coupling member and the second coupling member, and transmits torque of the second rotary electric machine to at least the second coupling member out of the first coupling member and the second coupling member. An example of a vehicle drive device having the configuration described above is disclosed in Japanese Unexamined Patent Application Publication No. 2017-141889 (JP 2017-141889 A). Hereinafter, the reference numerals in parentheses in the "BACKGROUND ART" section denote elements in JP 2017-141889 A.

As illustrated in FIGS. 1 and 7 of JP 2017-141889 A, a vehicle drive device (1) of JP 2017-141889 A includes two electric motors (2L, 2R), two output gear shafts (14L, 14R) drivingly coupled to left and right driving wheels (61L, 61R), a gear device (30) including two planetary gear mechanisms (30L, 30R), and a reducer housing (9) accommodating the gear device (30). The gear device (30) includes input-side outer gears (13a) that mesh with input gears (12a) to which power is transmitted from the electric motors (2L, 2R), and output-side small-diameter gears (13b) that mesh with output gears (14a) of the output gear shafts (14L, 14R). Further, the gear mechanism (30) is configured as described in paragraph 0110 of JP 2017-141889 A. Therefore, when the torque input from the electric motors (2L, 2R) to the input-side outer gears (13a) is output from the output-side small-diameter gears (13b) toward the driving wheel (61L, 61R), it is possible to distribute the torque to the left and right driving wheels (61L, 61R) in a manner such that the torque difference between the two electric motors (2L, 2R) is increased (paragraphs 0108 and 0166).

Generally, the performance of a rotary electric machine decreases due to heat generation. Therefore, when driving the electric machine, the rotary electric machine needs to be cooled in order to reduce the influence of heat generation on the performance. In the case of a vehicle drive device that includes a first rotary electric machine and a second rotary electric machine as described above, both the first rotary electric machine and the second rotary electric machine need to be appropriately cooled. For example, an oil passage for supplying oil to the first rotary electric machine and an oil passage for supplying oil to the second rotary electric machine may be individually formed in a case or the like so as to supply cooling oil to both the first rotary electric machine and the second rotary electric machine. With this configuration, however, it is likely to increase the man-hours required to process the case or the like. Note that JP 2017-141889 A does not disclose a cooling configuration for the rotary electric machines.

SUMMARY

An exemplary aspect of the disclosure provides a vehicle drive device capable of appropriately supplying oil to both a first rotary electric machine and a second rotary electric machine, while reducing the man-hours required to process a case or the like.

In view of the above, there is provided a vehicle drive device including: a first rotary electric machine; a second rotary electric machine; a first coupler drivingly coupled to a first wheel; a second coupler drivingly coupled to a second wheel; a transmission device that transmits torque of the first rotary electric machine to at least the first coupler out of the first coupler and the second coupler, and transmits torque of the second rotary electric machine to at least the second coupler out of the first coupler and the second coupler; and a case that accommodates the first rotary electric machine, the second rotary electric machine, the first coupler, the second coupler, and the transmission device. Here, the first rotary electric machine and the second rotary electric machine are disposed in this order from an axial first side defining one side in an axial direction, on a first axis; the first coupler and the second coupler are disposed on a second axis parallel to the first axis; an intermediate wall that is a member forming the case or that is a member fixed to the case is disposed to extend in a radial direction with respect to the first axis, between the first rotary electric machine and the second rotary electric machine in the axial direction; a first drive shaft that rotates with the first rotary electric machine and a second drive shaft that rotates with the second rotary electric machine are further disposed on the first axis; an end of the first drive shaft on an axial second side opposite to the axial first side in the axial direction is rotatably supported by the intermediate wall; an end of the second drive shaft on the axial first side is rotatably supported by the intermediate wall; a first oil passage for supplying oil to the first rotary electric machine is formed inside the first drive shaft in the axial direction; a second oil passage for supplying oil to the second rotary electric machine is formed inside the second drive shaft in the axial direction; a supply oil passage to which oil is supplied from a hydraulic pressure source is formed in the intermediate wall; and an end of the first oil passage on the axial second side and an end of the second oil passage on the axial first side are connected to the supply oil passage.

According to the characteristic configuration described above, oil can be supplied from the supply oil passage formed in the intermediate wall to both the first oil passage for supplying oil to the first rotary electric machine and the second oil passage for supplying oil to the second rotary electric machine. Accordingly, compared to the case where an oil passage for supplying oil to the first oil passage and an oil passage for supplying oil to the second oil passage are separately formed in the case or the like (a member forming the case or a member fixed to the case), it is possible to appropriately supply oil to both the first rotary electric machine and the second rotary electric machine, while reducing the man-hours required to process the case or the like.

Other features and advantages of the vehicle drive device will become apparent from the following description of the embodiments with reference to the accompanying drawings.

DETAILED DESCRIPTION OF EMBODIMENTS

An embodiment of a vehicle drive device will be described with reference to the drawings. In the present embodiment, a fifth case portion 35 corresponds to an "intermediate wall"; a first distance X1 corresponds to a "distance in the axial direction from a branch portion to a first rotary electric machine"; and a second distance X2 corresponds to a "distance in the axial direction from a branch portion to a second rotary electric machine".

As used in this disclosure, the term "drivingly coupled" refers to a state in which two rotary elements are coupled to allow transmission of the drive power. This concept includes a state in which the two rotary elements are coupled so as to rotate together, and a state in which the two rotary elements are coupled via one or more transmission members to allow transmission of a driving force. Examples of such transmission members include various types of members that transmit rotation at the same speed or a changed speed (such as a shaft, a gear mechanism, a belt, and a chain), and may include engagement devices that selectively transmit rotation and a driving force (such as a friction engagement device and a meshing-type engagement device). However, where the term "drivingly coupled" is used in connection with a differential gear device or rotary elements of the differential gear device, it refers to a state in which the differential gear device or the three or more rotary elements of the differential gear device are drivingly coupled to each other without any intervening rotary elements.

Further, as used in this disclosure, the term "rotary electric machine" refers to any of a motor (electric motor), a generator (electric generator), and a motor generator that serves as both a motor and a generator as necessary. Further, the expression "overlap as viewed in a predetermined direction" as used herein in connection with the arrangement of two members indicates that when a virtual line parallel to the viewing direction is moved in directions orthogonal to the virtual line, there is at least an area where the virtual line crosses both the two members. For example, the expression "overlap as viewed in a radial direction" indicates that there is at least an area in the circumferential direction where the virtual line crosses both the two members. Further, in the following description, the direction of each member indicates the direction of each member assembled in the vehicle drive device. Further, terms related to the direction, the location, and so on of each member may allow differences due to errors (acceptable manufacturing errors).

Figure 1:
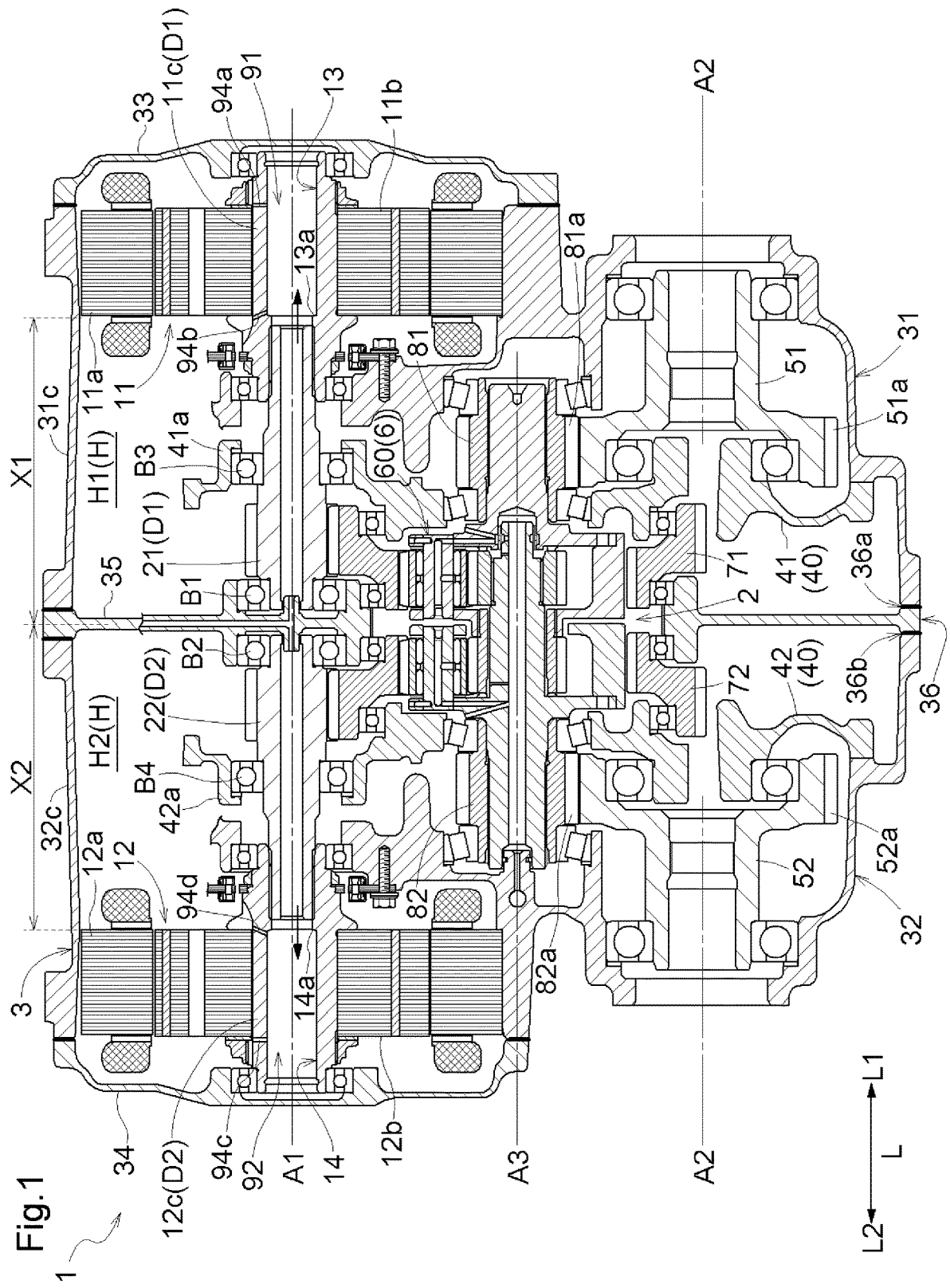
FIG. 1 is a cross-sectional view of a vehicle drive device according to an embodiment.
Figure 3:
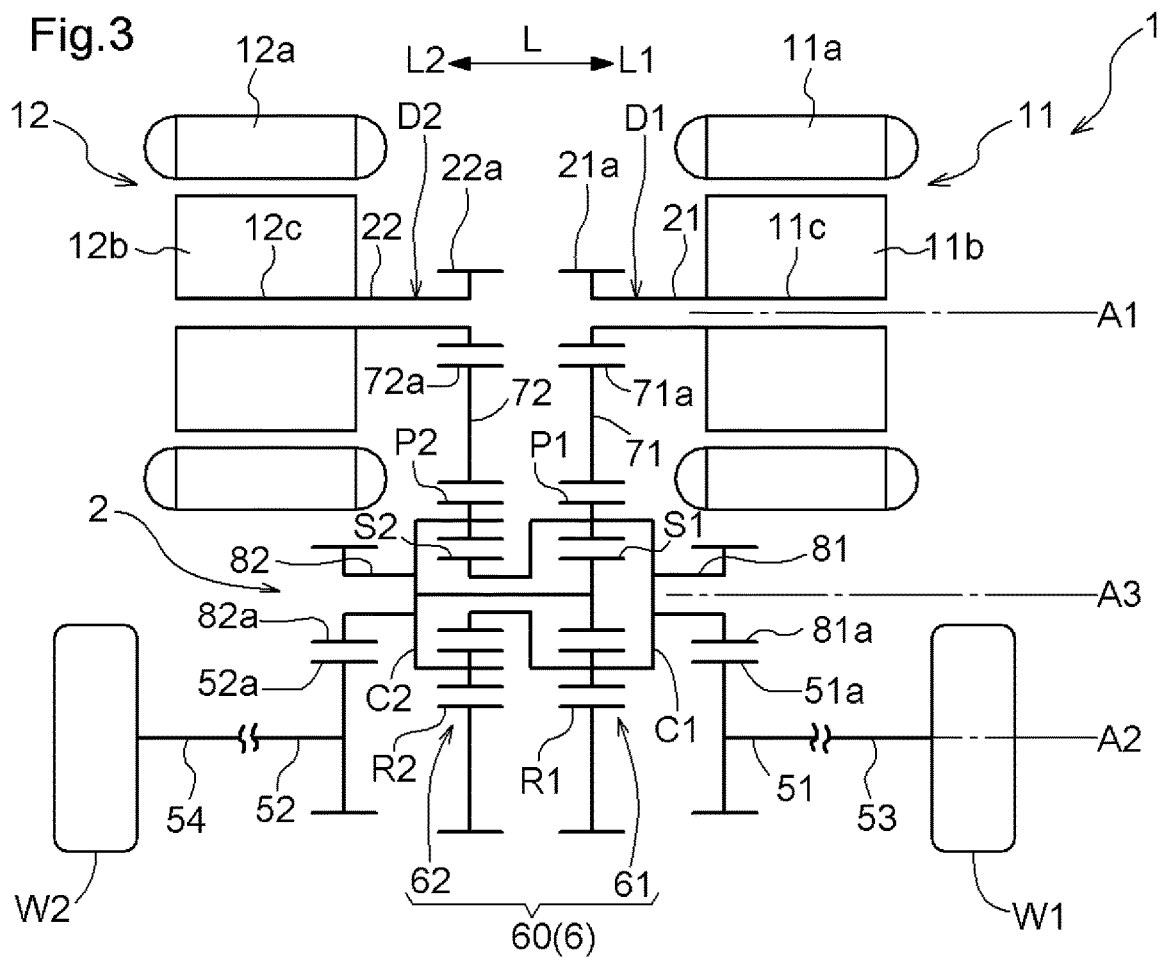
FIG. 3 is a skeleton diagram of the vehicle drive device according to the embodiment.

As illustrated in FIGS. 1 and 3, a vehicle drive device 1 includes a first rotary electric machine 11, a second rotary electric machine 12, a first coupling member 51 (first coupler) drivingly coupled to a first wheel W1, a second coupling member 52 (second coupler) drivingly coupled to a second wheel W2, and a transmission device 2. Further, as illustrated in FIG. 1, the vehicle drive device 1 includes a case 3 that accommodates the first rotary electric machine 11, the second rotary electric machine 12, the first coupling member 51, the second coupling member 52, and the transmission device 2. The term "accommodate" as used herein means to accommodate at least part of an object. For example, as illustrated in FIG. 1, in the present embodiment, the whole first coupling member 51 is accommodated in the case 3 (that is, disposed inside the case 3). However, only part of the first coupling member 51 may be accommodated in the case 3.

The transmission device 2 is a device that transmits the torque of the first rotary electric machine 11 to at least the first coupling member 51 out of the first coupling member 51 and the second coupling member 52, and transmits the torque of the second rotary electric machine 12 to at least the second coupling member 52 out of the first coupling member 51 and the second coupling member 52. The first wheel W1 is rotationally driven by the torque transmitted to the first coupling member 51, and the second wheel W2 is rotationally driven by the torque transmitted to the second coupling member 52, so that a vehicle (vehicle on which the vehicle drive device 1 is mounted; the same applies hereinafter) travels. As illustrated in FIG. 3, in the present embodiment, the first coupling member 51 is coupled to the first wheel W1 so as to rotate therewith via a first drive shaft 53, and the second coupling member 52 is coupled to the second wheel W2 so as to rotate therewith via a second drive shaft 54. The first wheel W1 and the second wheel W2 are a pair of right and left wheels that are disposed coaxially with each other (on a second axis A2 (described below) in the present embodiment).

In this manner, the vehicle drive device 1 is provided to drive a pair of right and left wheels. For example, if the vehicle includes a pair of right and left front wheels and a pair of right and left rear wheels, the vehicle drive device 1 may be provided to drive the pair of right and left front wheels, or may be provided to drive the pair of right and left rear wheels. In the former case, the pair of right and left front wheels corresponds to the first wheel W1 and the second wheel W2. In the latter case, the pair of right and left rear wheels corresponds to the first wheel W1 and the second wheel W2. In the case where the vehicle includes a pair of right and left front wheels and a pair of right and left rear wheels as described above, a pair of right and left wheels that is not driven by the vehicle drive device 1, out of the pair of right and left front wheels and the pair of right and left rear wheels, may be driven by another drive device (which may be a drive device having the same configuration as the vehicle drive device 1).

As illustrated in FIGS. 1 and 3, the first rotary electric machine 11 and the second rotary electric machine 12 are disposed on a first axis A1, and the first coupling member 51 and the second coupling member 52 are disposed on the second axis A2 parallel to the first axis A1. The transmission device 2 is disposed on a third axis A3 parallel to the first axis A1 and the second axis A2. The first axis A1, the second axis A2, and the third axis A3 are axes (virtual axes) different from each other. In the following description, the direction parallel to each of these axes (the first axis A1, the second axis A2, and the third axis A3) (the axial direction common to these axes) is referred to as an "axial direction L". Further, one side in the axial direction L is referred to as an "axial first side L1", and another side in the axial direction L (the side opposite to the axial first side L1 in the axial direction L) is referred to as an "axial second side L2". The first rotary electric machine 11 and the second rotary electric machine 12 are disposed in this order from the axial first side L1 on the first axis A1. In the following description, unless otherwise specified, a "radial direction R" represents a radial direction with respect to the first axis A1 (see FIG. 2).

The first rotary electric machine 11 includes a first stator 11a fixed to a non-rotary member such as the case 3, and a first rotor 11b rotatably supported with respect to the first stator 11a. The first rotor 11b is coupled to a first rotor shaft 11c so as to rotate therewith. The second rotary electric machine 12 includes a second stator 12a fixed to a non-rotary member such as the case 3, and a second rotor 12b rotatably supported with respect to the second stator 12a. The second rotor 12b is coupled to a second rotor shaft 12c so as to rotate therewith. Each of the first rotary electric machine 11 and the second rotary electric machine 12 is electrically connected to an electricity storage device such as a battery and a capacitor so as to be supplied with electricity from the electricity storage device to perform power running, or to supply electricity that is generated by the inertial force of the vehicle or the like to the electricity storage device so as to store the electricity therein.

In the present embodiment, the first rotary electric machine 11 is an inner rotor type rotary electric machine in which the first rotor 11b is disposed on the inner side with respect to the first stator 11a in the radial direction R so as to overlap the first stator 11a when viewed in the radial direction R. Further, in the present embodiment, the second rotary electric machine 12 is an inner rotor type rotary electric machine in which the second rotor 12b is disposed on the inner side with respect to the second stator 12a in the radial direction R so as to overlap the second stator 12a when viewed in the radial direction R.

Figure 2:
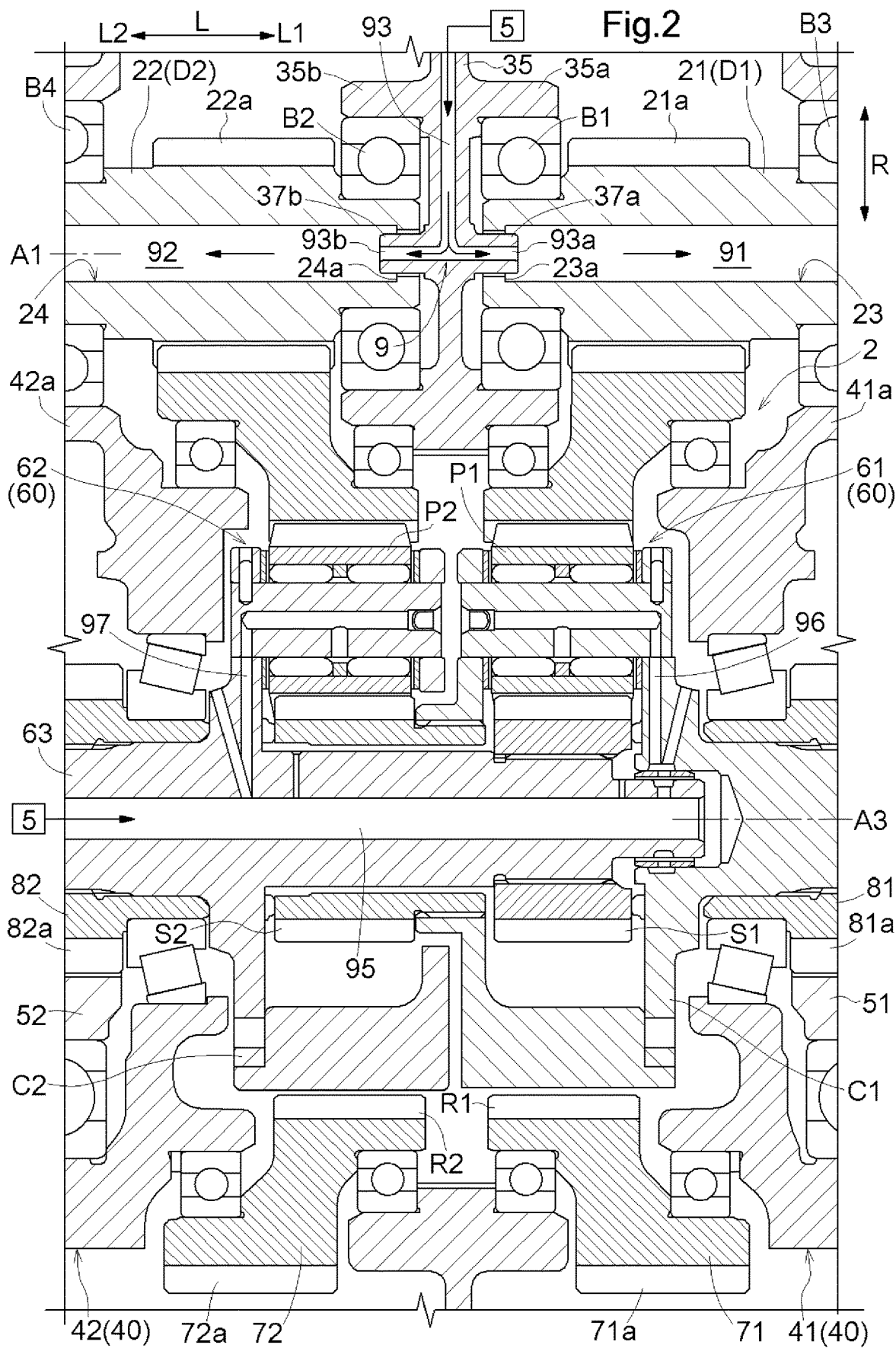
FIG. 2 is a partially enlarged view of FIG. 1.

As illustrated in FIGS. 2 and 3, the vehicle drive device 1 includes a first drive gear 21a drivingly coupled to the first rotary electric machine 11, and a second drive gear 22a drivingly coupled to the second rotary electric machine 12. The first drive gear 21a is a gear for outputting the torque of the first rotary electric machine 11, and meshes with an input gear (first input gear 71a) of the transmission device 2. The torque of the first rotary electric machine 11 is input to the transmission device 2 from a meshing portion between the first drive gear 21a and the first input gear 71a. The second drive gear 22a is a gear for outputting the torque of the second rotary electric machine 12, and meshes with an input gear (second input gear 72a) of the transmission device 2. The torque of the second rotary electric machine 12 is input to the transmission device 2 from a meshing portion between the second drive gear 22a and the second input gear 72a. The transmission device 2 includes a first input member 71 and a second input member 72. The first input member 71 includes the first input gear 71a that meshes with the first drive gear 21a, and the second input member 72 includes the second input gear 72a that meshes with the second drive gear 22a.

In the present embodiment, the first drive gear 21a is coupled to the first rotary electric machine 11 (first rotor 11b) so as to rotate therewith. Specifically, the vehicle drive device 1 includes a first drive member 21 (shaft member in this example) that is coupled to the first rotor shaft 11c so as to rotate therewith, on the axial second side L2 with respect to the first rotary electric machine 11, and the first drive gear 21a is formed on the outer peripheral surface of the first drive member 21. Further, in the present embodiment, the second drive gear 22a is coupled to the second rotary electric machine 12 (second rotor 12b) so as to rotate therewith. Specifically, the vehicle drive device 1 includes a second drive member 22 (shaft member in this example) that is coupled to the second rotor shaft 12c so as to rotate therewith, on the axial first side L1 with respect to the second rotary electric machine 12, and the second drive gear 22a is formed on the outer peripheral surface of the second drive member 22. Thus, a first drive shaft D1 that rotates with the first rotary electric machine 11 and a second drive shaft D2 that rotates with the second rotary electric machine 12 are disposed on the first axis A1. Further, in the present embodiment, the first drive shaft D1 includes the first rotor shaft 11c and the first drive member 21 coupled to each other, and the second drive shaft D2 includes the second rotor shaft 12c and the second drive member 22 coupled to each other. The first drive shaft D1 and the second drive shaft D2 are accommodated in the case 3.

As illustrated in FIGS. 1 and 3, each of the first coupling member 51 and the second coupling member 52 includes a driven gear that meshes with an output gear of the transmission device 2. Specifically, the first coupling member 51 includes a first driven gear 51a that meshes with a first output gear 81a of the transmission device 2, and the second coupling member 52 includes a second driven gear 52a that meshes with a second output gear 82a of the transmission device 2. The torque for rotationally driving the first wheel W1 is output from a meshing portion between the first output gear 81a and the first driven gear 51a to the first coupling member 51, and the torque for rotationally driving the second wheel W2 is output from a meshing portion between the second output gear 82a and the second driven gear 52a to the second coupling member 52. The transmission device 2 includes a first output member 81 and a second output member 82. The first output member 81 includes the first output gear 81a that meshes with the first driven gear 51a, and the second output member 82 includes the second output gear 82a that meshes with the second driven gear 52a.

In the present embodiment, the transmission device 2 includes a differential gear device 6. Here, a differential gear device is a gear device that includes a plurality of differentially rotatable rotary elements. That is, the differential gear device includes a differential gear mechanism including a plurality of differentially rotatable rotary elements. For example, the differential gear mechanism may be a planetary gear type differential gear device (that is, planetary gear device). In this case, the differential gear device includes a planetary gear type differential gear mechanism (that is, planetary gear mechanism). In another example, the differential gear mechanism may be a bevel gear type differential gear device. In this case, the differential gear device includes a bevel gear type differential gear mechanism. Although the plurality of rotary elements of the differential gear device 6 may include a non-rotary element fixed to a non-rotary member such as the case 3, the non-rotary member is also referred to herein as a "rotary element".

Figure 4:
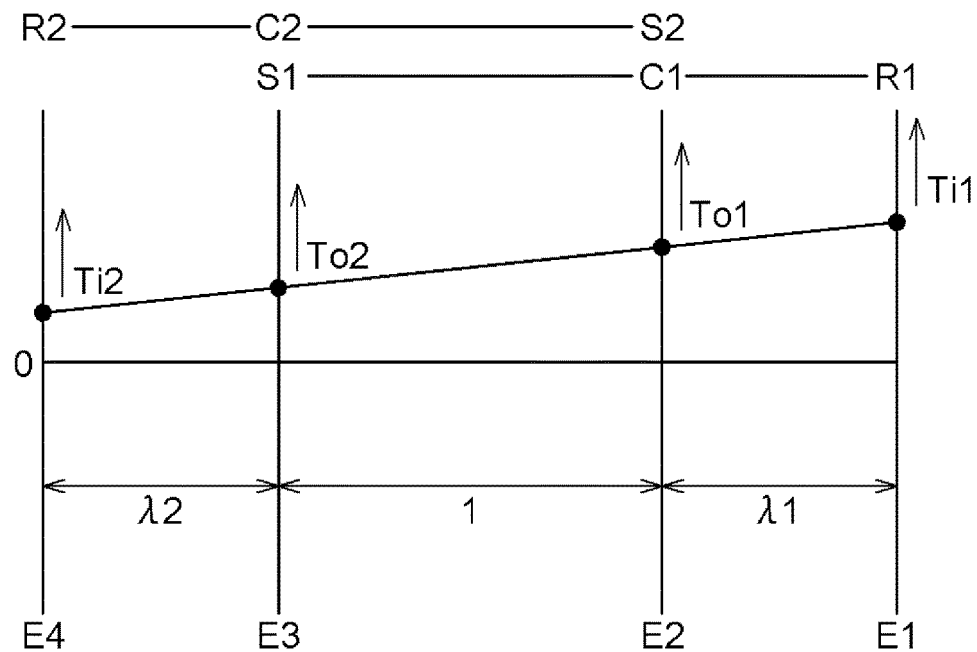
FIG. 4 is a velocity diagram of a planetary gear device according to the embodiment.

The differential gear device 6 includes a first rotary element E1, a second rotary element E2, a third rotary element E3, and a fourth rotary element E4 (see FIG. 4). The first input member 71 described above is coupled to the first rotary element E1, so that the first rotary electric machine 11 is drivingly coupled to the first rotary element E1. The first output member 81 described above is coupled to the second rotary element E2, so that the first coupling member 51 is drivingly coupled to the second rotary element E2. The second output member 82 described above is coupled to the third rotary element E3, so that the second coupling member 52 is drivingly coupled to the third rotary element E3. The second input member 72 described above is coupled to the fourth rotary element E4, so that the second rotary electric machine 12 is drivingly coupled to the fourth rotary element E4. In the present embodiment, the differential gear device 6 is a planetary gear device 60. That is, the transmission device 2 includes the planetary gear device 60 including at least the first rotary element E1 drivingly coupled to the first rotary electric machine 11, the second rotary element E2 drivingly coupled to the first coupling member 51, the third rotary element E3 drivingly coupled to the second coupling member 52, and the fourth rotary element E4 drivingly coupled to the second rotary electric machine 12. In the present embodiment, the planetary gear device 60 includes only the first rotary element E1, the second rotary element E2, the third rotary element E3, and the fourth rotary element E4, as rotary elements.

As illustrated in FIGS. 2 and 3, the planetary gear device 60 includes: a first planetary gear mechanism 61 including a first sun gear S1, a first carrier C1, and a first ring gear R1; and a second planetary gear mechanism 62 including a second sun gear S2, a second carrier C2, and a second ring gear R2. The first carrier C1 rotatably supports a first pinion gear P1, and the second carrier C2 rotatably supports a second pinion gear P2. The first planetary gear mechanism 61 and the second planetary gear mechanism 62 are coupled to form the planetary gear device 60. Specifically, in the present embodiment, both the first planetary gear mechanism 61 and the second planetary gear mechanism 62 are single pinion planetary gear mechanisms. The first carrier C1 and the second sun gear S2 are coupled so as to rotate together, and the first sun gear S1 and the second carrier C2 are coupled so as to rotate together. In this manner, two of the three rotary elements of the first planetary gear mechanism 61 and two of the three rotary elements of the second planetary gear mechanism 62 are coupled to each other so as to have four rotary elements as a whole to cooperatively perform a differential operation. The first planetary gear mechanism 61 is disposed on the axial first side L1 with respect to the second planetary gear mechanism 62. Further, in the present embodiment, the first planetary gear mechanism 61 is disposed on the axial second side L2 with respect to the first rotary electric machine 11, and the second planetary gear mechanism 62 is disposed on the axial first side L1 with respect to the second rotary electric machine 12. In this manner, the transmission device 2 includes the first planetary gear mechanism 61 and the second planetary gear mechanism 62 disposed on the third axis A3. In the present embodiment, each of the first planetary gear mechanism 61 and the second planetary gear mechanism 62 corresponds to a "planetary gear mechanism disposed on a third axis".

As illustrated in FIG. 3, in the present embodiment, the first rotary electric machine 11 is drivingly coupled to the first ring gear R1; the second rotary electric machine 12 is drivingly coupled to the second ring gear R2; the first coupling member 51 is drivingly coupled to the first carrier C1; and the second coupling member 52 is drivingly coupled to the second carrier C2. Accordingly, in the present embodiment, the first rotary element E1 to which the first rotary electric machine 11 is drivingly coupled corresponds to the first ring gear R1; the second rotary element E2 to which the first coupling member 51 is drivingly coupled corresponds to the first carrier C1 and the second sun gear S2 that rotate together; the third rotary element E3 to which the second coupling member 52 is drivingly coupled corresponds to the first sun gear S1 and the second carrier C2 that rotate together; and the fourth rotary element E4 to which the second rotary electric machine 12 is drivingly coupled corresponds to the second ring gear R2. In the present embodiment, the rotational speeds of the first rotary element E1, the second rotary element E2, the third rotary element E3, and the fourth rotary element E4 are set in this order.

The "order of rotational speed" refers to the order of rotational speed of rotary elements in a rotating state. Although the rotational speed of each rotary element changes in accordance with the rotating state of the differential gear device 6 (planetary gear device 60), the order of rotational speed of rotary elements is determined by the structure of the differential gear device 6, and therefore is fixed. Note that the "order of rotational speed of rotary elements" is the same as the order of arrangement of rotary elements in the speed diagram (collinear diagram; see FIG. 4). The "order of arrangement of rotary elements in the speed diagram" refers to the order in which axes corresponding to the rotating elements are arranged in the direction orthogonal to the axes in the speed diagram (collinear diagram). Although the direction in which the axes corresponding to the rotary elements are arranged in the speed diagram (collinear diagram) varies depending on how the speed diagram is drawn, the order of arrangement of the axes is determined by the structure of the differential gear device 6 and therefore is fixed. In FIG. 4, "0" on the vertical axis indicates that the rotational speed is zero. A point above "0" is positive, and a point below "0" is negative.

In FIG. 4, "Ti1" represents the torque (first input torque Ti1) input to the first rotary element E1 from the first rotary electric machine 11, and "Ti2" represents the torque (second input torque Ti2) input to the fourth rotary element E4 from the second rotary electric machine 12. The magnitude of the first input torque Ti1 is determined in accordance with the magnitude of the output torque of the first rotary electric machine 11 and a speed ratio (first speed ratio) from the first rotary electric machine 11 to the first rotary element E1; and the magnitude of the second input torque Ti2 is determined in accordance with the magnitude of the output torque of the second rotary electric machine 12 and a speed ratio (second speed ratio) from the second rotary electric machine 12 to the fourth rotary element E4. In the present embodiment, the first drive gear 21a and the second drive gear 22a are formed to have the same diameter; the first input gear 71a and the second input gear 72a are formed to have the same diameter; and the first speed ratio and the second speed ratio are equal to each other. In this example, the first speed ratio and the second speed ratio are greater than 1. Therefore, the rotation of the first rotary electric machine 11 is transmitted at a reduced speed to the first rotary element E1, and the rotation of the second rotary electric machine 12 is transmitted at a reduced speed to the fourth rotary element E4.

In FIG. 4, "To1" represents the torque (first output torque To1) output from the second rotary element E2 toward the first wheel W1, and "To2" represents the torque (second output torque To2) output from the third rotary element E3 toward the second wheel W2. The magnitude of the driving force of the first wheel W1 is determined in accordance with the magnitude of the first output torque To1 and a speed ratio (third speed ratio) from the second rotary element E2 to the first wheel W1, and the magnitude of the driving force of the second wheel W2 is determined in accordance with the magnitude of the second output torque To2 and a speed ratio (fourth speed ratio) from the third rotary element E3 to the second wheel W2. In the present embodiment, the first output gear 81a and the second output gear 82a are formed to have the same diameter; the first driven gear 51a and the second driven gear 52a are formed to have the same diameter; and the third speed ratio and the fourth speed ratio are equal to each other. In this example, the third speed ratio and the fourth speed ratio are greater than 1. Therefore, the rotation of the second rotary element E2 is transmitted at a reduced speed to the first wheel W1, and the rotation of the third rotary element E3 is transmitted at a reduced speed to the second wheel W2.

As described above, the third speed ratio and the fourth speed ratio are equal to each other. Therefore, when the vehicle is moving straight, the rotational speed of the second rotary element E2 and the rotational speed of the third rotary element E3 are equal, so that all the rotary elements of the planetary gear device 60 rotate at the same speed. Whereas, when the vehicle is turning, the rotational speed of the rotary element to which the wheel on the outer side (wheel farther from the turning center) out of the first wheel W1 and the second wheel W2 is drivingly coupled is higher than the rotational speed of the rotary element to which the wheel on the inner side (wheel closer to the turning center) out of the first wheel W1 and the second wheel W2 is drivingly coupled. FIG. 4 illustrates the state of the rotary elements of the planetary gear device 60 when the vehicle is turning with the first wheel W1 on the outer side.

Due to the balance of torques, the first output torque To1 and the second output torque To2 are each determined in accordance with the first input torque Ti1, the second input torque Ti2, a gear ratio (first gear ratio 1) of the first planetary gear mechanism 61, and a gear ratio (second gear ratio X2) of the second planetary gear mechanism 62, as represented by the following equations (1) and (2). Here, the first gear ratio X1 is the ratio of the number of teeth of the first sun gear S1 to the number of teeth of the first ring gear R1, and the second gear ratio X2 is the ratio of the number of teeth of the second sun gear S2 to the number of teeth of the second ring gear R2.

$$To1 = (1+\lambda 1) \cdot Ti1 - \lambda 2 \cdot Ti2 \qquad (1)$$

$$To2 = (1+\lambda 2) \cdot Ti2 - \lambda 1 \cdot Ti1 \qquad (2)$$

In this manner, the first output torque To1 and the second output torque To2 are each determined in accordance with both the first input torque Ti1 and the second input torque Ti2. That is, in the present embodiment, the transmission device 2 is configured to transmit the torque of the first rotary electric machine 11 to both the first coupling member 51 and the second coupling member 52, and transmit the torque of the second rotary electric machine 12 to both the first coupling member 51 and the second coupling member 52. In other words, the transmission device 2 is configured to distribute and transmit the torques of the first rotary electric machine 11 and the second rotary electric machine 12 to the first coupling member 51 and the second coupling member 52. Since the vehicle drive device 1 is configured as described above, upon setting a difference in driving force between the first wheel W1 and the second wheel W2, it is possible to secure a greater total driving force of the first wheel W1 and the second wheel W2, and thus to improve the traveling performance when the vehicle is turning, compared to the case where the power transmission path between the first rotary electric machine 11 and the first coupling member 51 and the power transmission path between the second rotary electric machine 12 and the second coupling member 52 are separated.

Specifically, for example, assume that a difference between the first output torque To1 and the second output torque To2 is to be set to 160 [N·m] when the magnitude of the first input torque Ti1 is 200 [N·m]. In this case, in the configuration of a comparative example in which To1=Ti1 and To2=Ti2 unlike the vehicle drive device 1 of the present embodiment, the magnitude of the second input torque Ti2 required to set the difference between the first output torque To1 and the second output torque To2 to 160 [N·m] is 40 [N·m]. Accordingly, in this comparative example, the sum of the first input torque Ti1 and the second input torque Ti2 (which is equal to the sum of the first output torque To1 and the second output torque To2) is 240 [N·m]. Meanwhile, in the vehicle drive device 1 in the present embodiment, when the magnitude of the first input torque Ti1 is 200 [N·m], if both the first gear ratio 1 and the second gear ratio X2 are "0.4", the magnitude of the second input torque Ti2 required to set the difference between the first output torque To1 and the second output torque To2 to 160 [N·m] is calculated as 111 [N·m] according to the equations (1) and (2). Accordingly, in this case, the sum of the first input torque Ti1 and the second input torque Ti2 (the sum of the first output torque To1 and the second output torque To2) is 311 [N·m]. Compared to the above comparative example, it is possible to secure the total driving force of the first wheel W1 and the second wheel W2 that is greater by a magnitude corresponding to a torque difference of 71 [N·m] (=311 [N·m]−240 [N·m]).

In the following, the configuration of the case 3 in the vehicle drive device 1 will be described. In the present embodiment, the case 3 is formed by joining a plurality of case portions such as a first case portion 31 and a second case portion 32 (described below). Each of the case portions of the case 3 is partially exposed outside the case 3. Specifically, a joining portion between the case portions of the case 3 is formed to be exposed outside the case 3. The case portions are joined to each other by, for example, bolts.

As illustrated in FIG. 1, the case 3 includes the first case portion 31 and the second case portion 32. The first case portion 31 is joined to the second case portion 32 from the axial first side L1. The first case portion 31 includes a first peripheral wall portion 31c formed in a tubular shape extending in the axial direction L. The space (first accommodation space H1) surrounded by the first peripheral wall portion 31c as viewed in the axial direction L accommodates the first rotary electric machine 11, the first drive member 21, the first coupling member 51, and a part of the transmission device 2 (specifically, the first input member 71, the first output member 81, and the first planetary gear mechanism 61). The second case portion 32 includes a second peripheral wall portion 32c formed in a tubular shape extending in the axial direction L. The space (second accommodation space H2) surrounded by the second peripheral wall portion 32c as viewed in the axial direction L accommodates the second rotary electric machine 12, the second drive member 22, the second coupling member 52, and a part of the transmission device 2 (specifically, the second input member 72, the second output member 82, and the second planetary gear mechanism 62). In the present embodiment, the first storage space H1 and the second storage space 112 are separated by the fifth case portion 35 (described below) in the axial direction L.

The case 3 further includes a third case portion 33 and a fourth case portion 34. A portion of the first storage space H1 where the first rotary electric machine 11 is disposed has an opening on the axial first side L1, without being defined by the first case portion 31. The third case portion 33 is joined to the first case portion 31 from the axial first side L1 so as to close the opening. A portion of the second storage space H2 where the second rotary electric machine 12 is disposed has an opening on the axial second side L2, without being defined by the second case portion 32. The fourth case portion 34 is joined to the second case portion 32 from the axial second side L2 so as to close the opening.

The case 3 further includes the fifth case portion 35. The fifth case portion 35 is disposed to extend in the radial direction R between the first rotary electric machine 11 and the second rotary electric machine 12 in the axial direction L. As used in this disclosure, the term "extend" in a certain direction means not only to extend parallel to that direction, but also to extend in any direction inclined at an angle less than a predetermined angle (e.g., less than 45 degrees) to that direction. As illustrated in FIG. 1, in the present embodiment, the fifth case portion 35 is disposed so as to have a portion extending parallel to the radial direction R. Specifically, a portion of the fifth case portion 35 excluding a first support portion 35a and a second support portion 35b (described below) is formed in a plate shape extending along the plane orthogonal to the axial direction L. The fifth case portion 35 forms a wall portion defining the inner space (the accommodation space H for accommodating the first rotary electric machine 11, the second rotary electric machine 12, the first coupling member 51, the second coupling member 52, and the transmission device 2) of the case 3 in the axial direction L. In the present embodiment, the fifth case portion 35 is disposed at the position in the axial direction L where a joining portion 36 between the first case portion 31 and the second case portion 32 is formed. Thus, the first storage space H1 and the second storage space H2 are separated by the fifth case portion 35 in the axial direction L.

Since the fifth case portion 35 is disposed as described above, the fifth case portion 35 is joined to each of the first case portion 31 and the second case portion 32 while being held between the first case portion 31 (first peripheral wall portion 31c) and the second case portion 32 (second peripheral wall portion 32c) on both sides in the axial direction L. That is, in the present embodiment, the first case portion 31 and the second case portion 32 are joined to each other at the joining portion 36 with the fifth case portion 35 interposed therebetween. Although not described in detail, a seal member (liquid gasket or the like) for preventing oil in the case 3 from leaking outside the case 3 is disposed on each joining face between different case portions such as a joining face (first joining face 36a) between the first case portion 31 and the fifth case portion 35 and a joining face (second joining face 36b) between the second case portion 32 and the fifth case portion 35. Note that in FIG. 1, the seal members are simplified and indicated by bold lines.

As illustrated in FIG. 1, the vehicle drive device 1 includes a support member 40 fixed to the case 3. The support member 40 is disposed inside the case 3. Therefore, unlike the joining portion between different case portions, a fixed portion between the support member 40 and the case 3 is not exposed outside the case 3. In the present embodiment, the vehicle drive device 1 includes, as the support member 40, a first support member 41 and a second support member 42 individually disposed inside the case 3. The first support member 41 is disposed on the axial first side L1 with respect to the fifth case portion 35 (that is, disposed in the first storage space H1) to be fixed to the first case portion 31, and is used to support members disposed in the first storage space H1. The second support member 42 is disposed on the axial second side L2 with respect to the fifth case portion 35 (that is, disposed in the second storage space H2) to be fixed to the second case portion 32, and is used to support members disposed in the second storage space H2. The first support member 41 and the second support member 42 are fixed to the case 3 by, for example, bolts.

In the following, the configuration for supplying oil to the first rotary electric machine 11 and the second rotary electric machine 12 in the vehicle drive device 1 of the present embodiment will be described.

As illustrated in FIGS. 1 and 2, a first oil passage 91 for supplying oil to the first rotary electric machine 11 is formed inside the first drive shaft D1 in the axial direction L. In this example, the first oil passage 91 is formed to extend parallel to the axial direction L. The first drive shaft D1 includes a tubular (cylindrical in this example) inner peripheral surface extending in the axial direction L, and the space surrounded by the inner peripheral surface defines the first oil passage 91. As mentioned above, in the present embodiment, the first drive shaft D1 includes the first rotor shaft 11c and the first drive member 21 that are joined to each other. Specifically, an engagement portion formed on the inner peripheral surface of an end of the first rotor shaft 11c on the axial second side L2 and an engagement portion formed on the outer peripheral surface of an end of the first drive member 21 on the axial first side L1 are engaged (spline-engaged in the present embodiment) with each other so as to restrict relative rotation between the first rotor shaft 11c and the first drive member 21 and allow relative movement in the axial direction L therebetween. Therefore, in the present embodiment, a portion of the first oil passage 91 on the axial first side L1 is formed inside the first rotor shaft 11c, and a portion of the first oil passage 91 on the axial second side L2 is formed inside the first drive member 21. Specifically, the portion of the first oil passage 91 on the axial first side L1 is defined by the space surrounded by the tubular (cylindrical in this example) inner peripheral surface (first inner peripheral surface 13) of the first rotor shaft 11c, and the portion of the first oil passage 91 on the axial second side L2 is defined by the space surrounded by the tubular (cylindrical in this example) inner peripheral surface (third inner peripheral surface 23) of the first drive member 21.

A second oil passage 92 for supplying oil to the second rotary electric machine 12 is formed inside the second drive shaft D2 in the axial direction L. In this example, the second oil passage 92 is formed to extend parallel to the axial direction L. The second drive shaft D2 includes a tubular (cylindrical in this example) inner peripheral surface extending in the axial direction L, and the space surrounded by the inner peripheral surface defines the second oil passage 92. As mentioned above, in the present embodiment, the second drive shaft D2 includes the second rotor shaft 12c and the second drive member 22 that are joined to each other. Specifically, an engagement portion formed on the inner peripheral surface of an end of the second rotor shaft 12c on the axial first side L1 and an engagement portion formed on the outer peripheral surface of an end of the second drive member 22 on the axial second side L2 are engaged (spline-engaged in the present embodiment) with each other so as to restrict relative rotation between the second rotor shaft 12c and the second drive member 22 and allow relative movement in the axial direction L therebetween. Therefore, in the present embodiment, a portion of the second oil passage 92 on the axial second side L2 is formed inside the second rotor shaft 12c, and a portion of the second oil passage 92 on the axial first side L1 is formed inside the second drive member 22. Specifically, the portion of the second oil passage 92 on the axial second side L2 is defined by the space surrounded by the tubular (cylindrical in this example) inner peripheral surface (second inner peripheral surface 14) of the second rotor shaft 12c, and the portion of the second oil passage 92 on the axial first side L1 is defined by the space surrounded by the tubular (cylindrical in this example) inner peripheral surface (fourth inner peripheral surface 24) of the second drive member 22.

As illustrated in FIG. 1, the first drive shaft D1 is disposed in the first storage space H1. Then, as illustrated in FIG. 2, an end of the first drive shaft D1 on the axial second side L2 is rotatably supported by the fifth case portion 35. Specifically, the fifth case portion 35 has the first support portion 35a projecting toward the axial first side L1 with respect to the portion (portion formed in a plate shape) of the fifth case portion 35 extending in the radial direction R. The first support portion 35a is formed in a tubular shape (cylindrical shape in this example) coaxial with the first axis A1, and a first bearing B1 (radial ball bearing in this example) is disposed between the inner peripheral surface of the first support portion 35a and the outer peripheral surface of the end of the first drive shaft D1 (first drive member 21 in the present embodiment) on the axial second side L2. Accordingly, the first drive shaft D1 (first drive member 21) is rotatably supported by the fifth case portion 35 from the outer side in the radial direction R.

The first drive member 21 is rotatably supported by a third support portion 41a disposed on the axial first side L1 with respect to the first support portion 35a, from the outer side in the radial direction R, via a third bearing B3 (radial ball bearing in this example). That is, the first drive member 21 is rotatably supported at two points in the axial direction L, by the first support portion 35a and the third support portion 41a. In the present embodiment, the third support portion 41a is formed on the first support member 41. The first drive gear 21a is formed on the outer peripheral surface of a portion of the first drive member 21 disposed between the first support portion 35a and the third support portion 41a in the axial direction L. Further, the first rotor shaft 11 coupled to the first drive member 21 is rotatably supported at two points in the axial direction L (two points located on the opposite sides in the axial direction L with respect to the first rotor 11b), by the first case portion 31 and the third case portion 33.

Although not described in detail, in the present embodiment, the first support member 41 has a support portion for supporting the first input member 71, a support portion for supporting the first output member 81, and a support portion for supporting the first coupling member 51, in addition to the third support portion 41a for supporting the first drive member 21. Further, the fifth case portion 35 has a support portion for supporting the first input member 71, in addition to the first support portion 35a for supporting the first drive member 21.

As illustrated in FIG. 1, the second drive shaft D2 is disposed in the second storage space H2. Then, as illustrated in FIG. 2, an end of the second drive shaft D2 on the axial first side L1 is rotatably supported by the fifth case portion 35. Specifically, the fifth case portion 35 has the second support portion 35b projecting toward the axial second side L2 with respect to the portion (portion formed in a plate shape) of the fifth case portion 35 extending in the radial direction R. The second support portion 35b is formed in a tubular shape (cylindrical shape in this example) coaxial with the first axis A1, and a second bearing B2 (radial ball bearing in this example) is disposed between the inner peripheral surface of the second support portion 35b and the outer peripheral surface of the end of the second drive shaft D2 (second drive member 22 in the present embodiment) on the axial first side L1. Accordingly, the second drive shaft D2 (second drive member 22) is rotatably supported by the fifth case portion 35 from the outer side in the radial direction R.

The second drive member 22 is rotatably supported by a fourth support portion 42a disposed on the axial second side L2 with respect to the second support portion 35b, from the outer side in the radial direction R, via a fourth bearing B4 (radial ball bearing in this example). That is, the second drive member 22 is rotatably supported at two points in the axial direction L, by the second support portion 35b and the fourth support portion 42a. In the present embodiment, the fourth support portion 42a is formed on the second support member 42. The second drive gear 22a is formed on the outer peripheral surface of a portion of the second drive member 22 disposed between the second support portion 35b and the fourth support portion 42a in the axial direction L. Further, the second rotor shaft 12c coupled to the second drive member 22 is rotatably supported at two points in the axial direction L (two points located on the opposite sides in the axial direction L with respect to the second rotor 12b), by the second case portion 32 and the fourth case portion 34.

Although not described in detail, in the present embodiment, the second support member 42 has a support portion for supporting the second input member 72, a support portion for supporting the second output member 82, and a support portion for supporting the second coupling member 52, in addition to the fourth support portion 42a for supporting the second drive member 22. Further, the fifth case portion 35 has a support portion for supporting the second input member 72, in addition to the second support portion 35b for supporting the second drive member 22.

As illustrated in a simplified manner in FIG. 2, the vehicle drive device 1 includes a hydraulic pressure source 5. The hydraulic pressure source 5 may be an electric oil pump driven by an electric motor, or a mechanical oil pump driven by power transmitted by the power transmission paths between the rotary electric machines (11, 12) and the wheels (W1, W2). The oil discharged from the hydraulic pressure source 5 is supplied to each of the first oil passage 91 and the second oil passage 92. More specifically, a supply oil passage 93 to which oil is supplied from the hydraulic pressure source 5 is formed in the fifth case portion 35. Then, an end of the first oil passage 91 on the axial second side L2 and an end of the second oil passage 92 on the axial first side L1 are connected to the supply oil passage 93. Thus, oil can be supplied from the supply oil passage 93 formed in the fifth case portion 35 to both the first oil passage 91 and the second oil passage 92.

In this manner, since oil can be supplied from the supply oil passage 93 formed in the fifth case portion 35 to both the first oil passage 91 and the second oil passage 92, the man-hours required to process the case 3 or the like can be reduced, compared to the case where an oil passage for supplying oil to the first oil passage 91 and an oil passage for supplying oil to the second oil passage 92 are separately formed in the case 3 or the like (a member forming the case 3 or a member fixed to the case 3). Also, since the oil passage for supplying oil to the first oil passage 91 and the oil passage for supplying oil to the second oil passage 92 can be integrated into one supply oil passage 93, the length of the vehicle drive device 1 in the axial direction L can be reduced, compared to the case where the oil passage for supplying oil to the first oil passage 91 and the oil passage for supplying oil to the second oil passage 92 are formed at two different positions in the axial direction L in the case 3 or the like.

Moreover, in the case where an oil passage (first supply oil passage) for supplying oil to the first oil passage 91 and an oil passage (second supply oil passage) for supplying oil to the second oil passage 92 are separately formed in the case 3 or the like, if the length of the oil passage connecting the hydraulic pressure source 5 and the first supply oil passage is reduced, the length of the oil passage connecting the hydraulic pressure source 5 and the second supply oil passage is increased or the like, which may make it difficult to reduce both the length of the oil passage from the hydraulic pressure source 5 to the first oil passage 91 and the length of the oil passage from the hydraulic pressure source 5 to the second oil passage 92. Meanwhile, in this vehicle drive device 1, as described above, oil can be supplied from the supply oil passage 93 to both the first oil passage 91 and the second oil passage 92. Therefore, both the length of the oil passage from the hydraulic pressure source 5 to the first oil passage 91 and the length of the oil passage from the hydraulic pressure source 5 to the second oil passage 92 can be reduced by reducing the length of the oil passage connecting the hydraulic pressure source 5 and the supply oil passage 93. This makes it possible to reduce the pressure loss of the oil supplied from the hydraulic pressure source 5. Further, as will be described below, in the present embodiment, a distance in the axial direction L from the supply oil passage 93 (branch portion 9 or branch) to the first rotary electric machine 11 and a distance in the axial direction L from the supply oil passage 93 (branch portion 9) to the second rotary electric machine 12 are equal, it is possible to reduce the pressure loss equally for both the oil supplied to the first rotary electric machine 11 and the oil supplied to the second rotary electric machine 12.

Hereinafter, the configuration of the supply oil passage 93 will be described in detail. As illustrated in FIG. 2, the supply oil passage 93 is formed to split at the branch portion 9 into a first branch oil passage 93a connected to the first oil passage 91, and a second branch oil passage 93b connected to the second oil passage 92. Then, in the present embodiment, the branch portion 9, the first branch oil passage 93a, and the second branch oil passage 93b are formed at the positions overlapping the first oil passage 91 and the second oil passage 92 as viewed in the axial direction L. Specifically, the branch portion 9 is formed at the position (that is, at the center in the radial direction R) overlapping the first oil passage 91 and the second oil passage 92 as viewed in the axial direction L. Accordingly, the upstream portion of the supply oil passage 93 with respect to the branch portion 9 is formed to extend inward in the radial direction R toward the branch portion 9. The first branch oil passage 93a is formed to extend in the axial direction L from the branch portion 9 to the axial first side L1. The second branch oil passage 93b is formed to extend in the axial direction L from the branch portion 9 to the axial second side L2. In the present embodiment, both the first branch oil passage 93a and the second branch oil passage 93b are formed to extend in the axial direction L. That is, in the present embodiment, the first oil passage 91, the second oil passage 92, the first branch oil passage 93a, and the second branch oil passage 93b are formed to extend coaxially with each other on the first axis A1.

The first branch oil passage 93a is connected to the end of the first oil passage 91 on the axial second side L2. Specifically, the fifth case portion 35 has a first projecting portion 37a projecting toward the axial first side L1 with respect to the portion (portion formed in a plate shape) of the fifth case portion 35 extending in the radial direction R. In the present embodiment, the first projecting portion 37a is integrally formed with the fifth case portion 35. The first projecting portion 37a is formed in a tubular shape (cylindrical shape in this example) coaxial with the first axis A1, and the space surrounded by the inner peripheral surface of the first projecting portion 37a defines the first branch oil passage 93a. That is, the first branch oil passage 93a is formed to be open to an end face of the first projecting portion 37a on the axial first side L1. The diameter of the outer peripheral surface of the first projecting portion 37a is less than the diameter of the inner peripheral surface (third inner peripheral surface 23 in the present embodiment) of the first drive shaft D1, and an end of the first projecting portion 37a on the axial first side L1 is disposed in the space surrounded by the inner peripheral surface (third inner peripheral surface 23) of the first drive shaft D1. That is, the end face of the first projecting portion 37a on the axial first side L1 is disposed on the axial first side L1 with respect to an end face of the first drive shaft D1 (first drive member 21 in the present embodiment) on the axial second side L2. Since the first projecting portion 37a is disposed in this manner, the opening of the first branch oil passage 93a is disposed inside the first oil passage 91. As a result, oil can be efficiently supplied from the first branch oil passage 93a to the first oil passage 91.

As illustrated in FIG. 2, in the present embodiment, the inner peripheral surface (third inner peripheral surface 23) of the first drive shaft D1 has a third step portion 23a having a step surface facing the axial first side L1 (surface whose normal vector pointing outward has a component directed to the axial first side L1). The inner peripheral surface (third inner peripheral surface 23) of the first drive shaft D1 is formed to have a smaller diameter at the portion on the axial second side L2 with respect to the third step portion 23a than at the portion on the axial first side L1 with respect to the third step portion 23a. This prevents the oil supplied from the first branch oil passage 93a to the first oil passage 91 from flowing to the axial second side L2 through a clearance between the first drive shaft D1 and the first projecting portion 37a in the radial direction R, thereby improving the efficiency in supplying oil from the first branch oil passage 93a to the first oil passage 91.

The second branch oil passage 93b is connected to the end of the second oil passage 92 on the axial first side L1. Specifically, the fifth case portion 35 has a second projecting portion 37b projecting toward the axial second side L2 with respect to the portion (portion formed in a plate shape) of the fifth case portion 35 extending in the radial direction R. In the present embodiment, the second projecting portion 37b is integrally formed with the fifth case portion 35. The second projecting portion 37b is formed in a tubular shape (cylindrical shape in this example) coaxial with the first axis A1, and the space surrounded by the inner peripheral surface of the second projecting portion 37b defines the second branch oil passage 93b. That is, the second branch oil passage 93b is formed to be open to an end face of the second projecting portion 37b on the axial second side L2. The diameter of the outer peripheral surface of the second projecting portion 37b is less than the diameter of the inner peripheral surface (fourth inner peripheral surface 24 in the present embodiment) of the second drive shaft D2, and an end of the second projecting portion 37b on the axial second side L2 is disposed in the space surrounded by the inner peripheral surface (fourth inner peripheral surface 24) of the second drive shaft D2. That is, the end face of the second projecting portion 37b on the axial second side L2 is disposed on the axial second side L2 with respect to an end face of the second drive shaft D2 (second drive member 22 in the present embodiment) on the axial first side L1. Since the second projecting portion 37b is disposed in this manner, the opening of the second branch oil passage 93b is disposed inside the second oil passage 92. As a result, oil can be efficiently supplied from the second branch oil passage 93b to the second oil passage 92.

As illustrated in FIG. 2, in the present embodiment, the inner peripheral surface (fourth inner peripheral surface 24 in the present embodiment) of the second drive shaft D2 has a fourth step portion 24a having a step surface facing the axial second side L2 (surface whose normal vector pointing outward has a component directed to the axial second side L2). The inner peripheral surface (fourth inner peripheral surface 24) of the second drive shaft D2 is formed to have a smaller diameter at the portion on the axial first side L1 with respect to the fourth step portion 24a than at the portion on the axial second side L2 with respect to the fourth step portion 24a. This prevents the oil supplied from the second branch oil passage 93b to the second oil passage 92 from flowing toward the axial first side L1 through a clearance between the second drive shaft D2 and the second projecting portion 37b in the radial direction R, thereby improving the efficiency in supplying oil from the second branch oil passage 93b to the second oil passage 92.

The first rotary electric machine 11 is cooled by the oil supplied from the supply oil passage 93 to the first rotary electric machine 11 via the first oil passage 91, and the second rotary electric machine 12 is cooled by the oil supplied from the supply oil passage 93 to the second rotary electric machine 12 via the second oil passage 92. Although various configurations are applicable as the cooling configuration for the first rotary electric machine 11 and the second rotary electric machine 12, the following configuration is applied as an example in the present embodiment.

As illustrated in FIG. 1, the first rotor shaft 11c has a first oil hole 94a and a second oil hole 94b for communication between the inner peripheral surface (first inner peripheral surface 13) and the outer peripheral surface of the first rotor shaft 11c. The oil that has flowed from the supply oil passage 93 into the first oil passage 91 flows to the axial first side L1 while being pressed against the inner peripheral surface of the first oil passage 91 by the centrifugal force due to the rotation of the first drive shaft D1. Then, heat is exchanged between the oil that has reached a portion of the first oil passage 91 defined by the space surrounded by the first inner peripheral surface 13 and the first rotor shaft 11c, so that the first rotor 11b fixed to the first rotor shaft 11c is cooled from the inner side in the radial direction R. Further, the oil that has reached a portion of the first oil passage 91 defined by the space surrounded by the first inner peripheral surface 13 is discharged from the first oil hole 94a and the second oil hole 94b to the space on the outer side with respect to the first rotor shaft 11c in the radial direction R by the centrifugal force due to the rotation of the first drive shaft D1. Then, the oil discharged from the first oil hole 94a and the second oil hole 94b is supplied to a coil end portion of a coil wound around the first stator 11a, so that the coil end portion is cooled.

In the present embodiment, to promote creation of a smooth flow of oil to the axial first side L1 (that is, smooth flow of oil to the first rotary electric machine 11) in the first oil passage 91, the first oil passage 91 is formed to have an inner diameter that increases in a stepwise manner toward the axial first side L1. As illustrated in FIG. 1, the first drive member 21 is inserted inside the first rotor shaft 11c at the coupling portion (spline engagement portion in the present embodiment) between the first rotor shaft 11c and the first drive member 21, and the inner diameter of the first oil passage 91 is greater at the position in the axial direction L where an end face of the first drive member 21 on the axial first side L1 is disposed than at the portion on the axial second side L2 with respect to this position, by the difference in diameter between the inner peripheral surface (third inner peripheral surface 23) of the first drive member 21 and the inner peripheral surface (first inner peripheral surface 13) of the first rotor shaft 11c. Further, as illustrated in FIG. 1, the first inner peripheral surface 13 has a first step portion 13a having a step surface facing the axial first side L1. The first inner peripheral surface 13 is formed to have a greater diameter at the portion on the axial first side L1 with respect to the first step portion 13a than at the portion on the axial second side L2 with respect to the first step portion 13a, by the height of the first step portion 13a. Accordingly, the inner diameter of the first oil passage 91 is greater at the position in the axial direction L where the first step portion 13a is formed than at the portion on the axial second side L2 with respect to this position, by the height of the first step portion 13a. Note that the portion of the first inner peripheral surface 13 on the axial first side L with respect to the first step portion 13a is formed to have a greater diameter than the outer peripheral surface of the portion of the first drive member 21 inserted inside the first rotor shaft 11c. Since the first oil passage 91 is formed to have an inner diameter that increases in a stepwise manner toward the axial first side L1 as described above, the oil pressed against the inner peripheral surface of the first oil passage 91 by the centrifugal force due to the rotation of the first drive shaft D1 can be prevented from flowing to the axial second side L2. This makes it easy to create a smooth flow of oil to the axial first side L1 in the first oil passage 91. In this example, the inner diameter of the first oil passage 91 increases in a stepwise manner at two positions in the axial direction L. However, the inner diameter of the first oil passage 91 may increase in a stepwise manner at one position or three or more positions in the axial direction L. For example, the first inner peripheral surface 13 may include no such first step portion 13a, and the inner diameter of the first oil passage 91 may increase in a stepwise manner only at one position in the axial direction L.

Also, as illustrated in FIG. 1, the second rotor shaft 12c has a third oil hole 94c and a fourth oil hole 94d for communication between the inner peripheral surface (second inner peripheral surface 14) and the outer peripheral surface of the second rotor shaft 12c. The oil that has flowed from the supply oil passage 93 into the second oil passage 92 flows to the axial second side L2 while being pressed against the inner peripheral surface of the second oil passage 92 by the centrifugal force due to the rotation of the second drive shaft D2. Then, heat is exchanged between the oil that has reached a portion of the second oil passage 92 defined by the space surrounded by the second inner peripheral surface 14 and the second rotor shaft 12c, so that the second rotor 12b fixed to the second rotor shaft 12c is cooled from the inner side in the radial direction R. Further, the oil that has reached a portion of the second oil passage 92 defined by the space surrounded by the second inner peripheral surface 14 is discharged from the third oil hole 94c and the fourth oil hole 94d to the space on the outer side with respect to the second rotor shaft 12c in the radial direction R by the centrifugal force due to the rotation of the second drive shaft D2. Then, the oil discharged from the third oil hole 94c and the fourth oil hole 94d is supplied to a coil end portion of a coil wound around the second stator 12a, so that the coil end portion is cooled.

In the present embodiment, to promote creation of a smooth flow of oil to the axial second side L2 (that is, smooth flow of oil to the second rotary electric machine 12) in the second oil passage 92, the second oil passage 92 is formed to have an inner diameter that increases in a stepwise manner toward the axial second side L2. As illustrated in FIG. 1, the second drive member 22 is inserted inside the second rotor shaft 12c at the coupling portion (spline engagement portion in the present embodiment) between the second rotor shaft 12c and the second drive member 22, and the inner diameter of the second oil passage 92 is greater at the position in the axial direction L where an end face of the second drive member 22 on the axial second side L2 is disposed than at the portion on the axial first side L1 with respect to this position, by the difference in diameter between the inner peripheral surface (fourth inner peripheral surface 24) of the second drive member 22 and the inner peripheral surface (second inner peripheral surface 14) of the second rotor shaft 12c. Further, as illustrated in FIG. 1, the second inner peripheral surface 14 has a second step portion 14a having a step surface facing the axial second side L2. The second inner peripheral surface 14 is formed to have a greater diameter at the portion on the axial second side L2 with respect to the second step portion 14a than at the portion on the axial first side L1 with respect to the second step portion 14a, by the height of the second step portion 14a. Accordingly, the inner diameter of the second oil passage 92 is greater at the position in the axial direction L where the second step portion 14a is formed than at the portion on the axial first side L1 with respect to this position, by the height of the second step portion 14a. Note that the portion of the second inner peripheral surface 14 on the axial second side L2 with respect to the second step portion 14a is formed to have a greater diameter than the outer peripheral surface of the portion of the second drive member 22 inserted inside the second rotor shaft 12c. Since the second oil passage 92 is formed to have an inner diameter that increases in a stepwise manner toward the axial second side L2 as described above, the oil pressed against the inner peripheral surface of the second oil passage 92 by the centrifugal force due to the rotation of the second drive shaft D2 can be prevented from flowing to the axial first side L1. This makes it easy to create a smooth flow of oil to the axial second side L2 in the second oil passage 92. In this example, the inner diameter of the second oil passage 92 increases in a stepwise manner at two positions in the axial direction L. However, the inner diameter of the second oil passage 92 may increase in a stepwise manner at one position or three or more positions in the axial direction L. For example, the second inner peripheral surface 14 may include no such second step portion 14a, and the inner diameter of the second oil passage 92 may increase in a stepwise manner only at one position in the axial direction L.

Further, in the present embodiment, the distance in the axial direction L (first distance X1) from the branch portion 9 to the first rotary electric machine 11 and the distance in the axial direction L (second distance X2) from the branch portion 9 to the second rotary electric machine 12 are equal. That is, the branch portion 9 is disposed at the center position between the first rotary electric machine 11 and the second rotary electric machine 12 in the axial direction L. Note that in FIG. 1, the first distance X1 is defined as the distance in the axial direction L from the branch portion 9 (see FIG. 2) to an end face of the first rotor 11b (rotor core) on the axial second side L2, and the second distance X2 is defined as the distance in the axial direction L from the branch portion 9 to an end face of the second rotor 12b (rotor core) on the axial first side L1 (hereinafter referred to as a "first setting example"). However, the definition of the first distance X1 and the second distance X2 is not limited thereto. For example, the first distance X1 may be defined as the distance in the axial direction L from the branch portion 9 to a center position of the first rotor 11b in the axial direction L, and the second distance X2 may be defined as the distance in the axial direction L from the branch portion 9 to a center position of the second rotor 12b in the axial direction L (hereinafter referred to as a "second setting example"). Then, the first rotary electric machine 11 and the second rotary electric machine 12 may be disposed such that the first distance X1 and the second distance X2 become equal. In the present embodiment, since the width of the first rotor 11b in the axial direction L and the width of the second rotor 12b in the axial direction L are equal, if the first rotary electric machine 11 and the second rotary electric machine 12 are disposed such that the first distance X1 and the second distance X2 become equal in the case where the first distance X1 and the second distance X2 are set as in the first setting example, the first distance X1 and the second distance X2 become equal even in the case where the first distance X1 and the second distance X2 are set as in the second setting example. Alternatively, the first distance X1 may be defined as the distance in the axial direction L from the branch portion 9 to an oil hole (the oil hole disposed on the most axial second side L2 if a plurality of oil holes (94a, 94b) are formed at different positions in the axial direction L as in the present embodiment, for example) formed in the first rotor shaft 11c, and the second distance X2 may be defined as the distance in the axial direction L from the branch portion 9 to an oil hole (the oil hole disposed on the most axial first side L1 if a plurality of oil holes (94c, 94d) are formed at different positions in the axial direction L as in the present embodiment, for example) formed in the second rotor shaft 12c. Then, the first rotary electric machine 11 and the second rotary electric machine 12 may be disposed such that the first distance X1 and the second distance X2 become equal.

As described above, in the present embodiment, the first rotary electric machine 11 and the second rotary electric machine 12 are disposed such that the first distance X1 and the second distance X2 become equal. Therefore, when the vehicle is moving straight, it is possible to reduce the imbalance between the amount of oil supplied to the first rotary electric machine 11 and the amount of oil supplied to the second rotary electric machine 12, and equally cool the first rotary electric machine 11 and the second rotary electric machine 12. Moreover, in the present embodiment, in order to further reduce the imbalance between the amount of oil supplied to the first rotary electric machine 11 and the amount of oil supplied to the second rotary electric machine 12 when the vehicle is moving straight, the first branch oil passage 93a and the second branch oil passage 93b are formed to have the same oil passage cross-sectional area and the same oil passage length, and the first oil passage 91 and the second oil passage 92 are formed to have the same oil passage cross-sectional area and the same oil passage length. Specifically, the first projecting portion 37a and the second projecting portion 37b are formed to be mirror-symmetrical with respect to a plane of symmetry passing through the branch portion 9 and orthogonal to the axial direction L, and the first drive shaft D1 and the second drive shaft D2 are formed to be mirror-symmetrical with respect to the same plane of symmetry.

As described above, since the first rotary electric machine 11 and the second rotary electric machine 12 can be equally cooled when the vehicle is traveling straight, it is easy to combine the output torque of the first rotary electric machine 11 and the second rotary electric machine 12 so as to achieve a stable straight movement of the vehicle. That is, the output torque of a rotary electric machine is generally temperature dependent. Therefore, even in the case where, for example, two rotary electric machines having the same characteristics are used as the first rotary electric machine 11 and the second rotary electric machine 12, if a temperature difference is generated between the first rotary electric machine 11 and the second rotary electric machine 12, a difference in output torque is generated between the first rotary electric machine 11 and the second rotary electric machine 12 even when the same current command is given to the first rotary electric machine 11 and the second rotary electric machine 12. Meanwhile, in the vehicle drive device 1 of the present embodiment, since the first rotary electric machine 11 and the second rotary electric machine 12 can be equally cooled when the vehicle is traveling straight as described above, the temperature difference between the first rotary electric machine 11 and the second rotary electric machine 12 can be reduced. This makes it easy to combine the output torque of the first rotary electric machine 11 and the second rotary electric machine 12.

When the vehicle is turning in such a direction that the first wheel W1 is on the outer side, the first rotary electric machine 11 is controlled to output greater torque than the second rotary electric machine 12, and therefore the first rotary electric machine 11 is likely to generate a greater amount of heat than the second rotary electric machine 12. Regarding this, when the vehicle is turning in such a direction, a force toward the axial first side L1 is applied to the oil in the branch portion 9 due to the centrifugal force generated by turning of the vehicle. Therefore, the amount of oil that is supplied from the branch portion 9 to the first oil passage 91 via the first branch oil passage 93a can be made greater than the amount of oil that is supplied from the branch portion 9 to the second oil passage 92 via the second branch oil passage 93b. This makes it possible to supply a greater amount of oil to the first rotary electric machine 11 and preferentially cool the first rotary electric machine 11. Meanwhile, when the vehicle is turning in such a direction that the second wheel W2 is on the outer side, the second rotary electric machine 12 is controlled to output greater torque than the first rotary electric machine 11, and therefore the second rotary electric machine 12 is likely to generate a greater amount of heat than the first rotary electric machine 11. Regarding this, when the vehicle is turning in such a direction, a force toward the axial second side L2 is applied to the oil in the branch portion 9 due to the centrifugal force generated by turning of the vehicle. Therefore, the amount of oil that is supplied from the branch portion 9 to the second oil passage 92 via the second branch oil passage 93b can be made greater than the amount of oil that is supplied from the branch portion 9 to the first oil passage 91 via the first branch oil passage 93a. This makes it possible to supply a greater amount of oil to the second rotary electric machine 12 and preferentially cool the second rotary electric machine 12.

In the following, the configuration for supplying oil to the first planetary gear mechanism 61 and the second planetary gear mechanism 62 in the vehicle drive device 1 of the present embodiment will be described. As illustrated in FIG. 2, a third oil passage 95 for supplying oil to the planetary gear mechanisms (the first planetary gear mechanism 61 and the second planetary gear mechanism 62 in this example) disposed on the third axis A3 is formed inside the shaft member 63 disposed on the third axis A3. The third oil passage 95 is formed in the axial direction L. In this example, the third oil passage 95 is formed to extend parallel to the axial direction L. The shaft member 63 includes a tubular (cylindrical in this example) inner peripheral surface extending in the axial direction L, and the space surrounded by the inner peripheral surface defines the third oil passage 95. In the present embodiment, the shaft member 63 is coupled to the first sun gear S1 and the second carrier C2 so as to rotate therewith. Further, the shaft member 63 is coupled to the second output member 82 so as to rotate therewith.

As illustrated in a simplified manner in FIG. 2, the oil discharged from the hydraulic pressure source 5 is supplied to the third oil passage 95. In the present embodiment, as illustrated in FIG. 2, a fourth oil passage 96 that supplies the oil in the third oil passage 95 to a bearing rotatably supporting the first pinion gear P1 is formed in the first carrier C1, and a fifth oil passage 97 that supplies the oil in the third oil passage 95 to a bearing rotatably supporting the second pinion gear P2 is formed in the second carrier C2. Accordingly, it is possible to lubricate these bearings with the oil supplied to the third oil passage 95.

Although not described in detail, the oil discharged from the hydraulic pressure source 5 is supplied to the third oil passage 95 without passing through the supply oil passage 93, and is supplied to the supply oil passage 93 without passing through the third oil passage 95. This makes it possible to increase the independence between supply of oil to the supply oil passage 93 and supply of oil to the third oil passage 95, that is, the independence between supply of oil to the rotary electric machines (11, 12) and supply of oil to the planetary gear mechanisms (61, 62).

Other Embodiments

Hereinafter, other embodiments of a vehicle drive device will be described.

(1) In the above embodiments, the first carrier C1 and the second sun gear S2 are coupled, and the first sun gear S1 and the second carrier C2 are coupled, so that the first planetary gear mechanism 61 and the second planetary gear mechanism 62 have four rotary elements (E1 to E4) as a whole to cooperatively perform a differential operation. However, the present disclosure is not limited to this configuration. For example, the first carrier C1 and the second ring gear R2 may be coupled, and the first ring gear R1 and the second carrier C2 may be coupled, so that the first planetary gear mechanism 61 and the second planetary gear mechanism 62 have four rotary elements (E1 to E4) as a whole to cooperatively perform a differential operation. In this case, the first rotary electric machine 11 may be drivingly coupled to the first sun gear S1; the first coupling member 51 may be drivingly coupled to the first carrier C1 and the second ring gear R2 that rotate together; the second coupling member 52 may be drivingly coupled to the first ring gear R1 and the second carrier C2 that rotate together; and the second rotary electric machine 12 may be drivingly coupled to the second sun gear S2. With this configuration, as in the above embodiments, the rotational speeds of the first rotary element E1 drivingly coupled to the first rotary electric machine 11, the second rotary element E2 drivingly coupled to the first coupling member 51, the third rotary element E3 drivingly coupled to the second coupling member 52, and the fourth rotary element E4 drivingly coupled to the second rotary electric machine 12 can be set in this order.

(2) In the above embodiments, both the first planetary gear mechanism 61 and the second planetary gear mechanism 62 are single pinion planetary gear mechanisms. However, the present disclosure is not limited to this configuration. For example, both the first planetary gear mechanism 61 and the second planetary gear mechanism 62 may be double pinion planetary gear mechanisms. In this case, the first carrier C1 and the second ring gear R2 may be coupled, and the first ring gear R1 and the second carrier C2 may be coupled, so that the first planetary gear mechanism 61 and the second planetary gear mechanism 62 have four rotary elements (E1 to E4) as a whole to cooperatively perform a differential operation. In this case, the first rotary electric machine 11 may be drivingly coupled to the first sun gear S1; the first coupling member 51 may be drivingly coupled to the first ring gear R1 and the second carrier C2 that rotate together; the second coupling member 52 may be drivingly coupled to the first carrier C1 and the second ring gear R2 that rotate together; and the second rotary electric machine 12 may be drivingly coupled to the second sun gear S2. With this configuration, as in the above embodiments, the rotational speeds of the first rotary element E1 drivingly coupled to the first rotary electric machine 11, the second rotary element E2 drivingly coupled to the first coupling member 51, the third rotary element E3 drivingly coupled to the second coupling member 52, and the fourth rotary element E4 drivingly coupled to the second rotary electric machine 12 can be set in this order.

(3) In the above embodiments, the transmission device 2 is configured to transmit the torque of the first rotary electric machine 11 to both the first coupling member 51 and the second coupling member 52, and transmit the torque of the second rotary electric machine 12 to both the first coupling member 51 and the second coupling member 52. However, the present disclosure is not limited to this configuration. The transmission device 2 may transmit the torque of the first rotary electric machine 11 only to the first coupling member 51 out of the first coupling member 51 and the second coupling member 52, and transmit the torque of the second rotary electric machine 12 only to the second coupling member 52 out of the first coupling member 51 and the second coupling member 52. That is, the power transmission path between the first rotary electric machine 11 and the first coupling member 51 and the power transmission path between the second rotary electric machine 12 and the second coupling member 52 may be separated.

For example, unlike the above embodiments in which the first planetary gear mechanism 61 and the second planetary gear mechanism 62 are coupled, the first planetary gear mechanism 61 and the second planetary gear mechanism 62 may perform a differential operation independently from each other. With this configuration, the power transmission path between the first rotary electric machine 11 and the first coupling member 51 and the power transmission path between the second rotary electric machine 12 and the second coupling member 52 can be separated. In this case, the first planetary gear mechanism 61 includes the first rotary element E1 drivingly coupled to the first rotary electric machine 11, the second rotary element E2 drivingly coupled to the first coupling member 51, and a fifth rotary element; and the second planetary gear mechanism 62 includes the third rotary element E3 drivingly coupled to the second coupling member 52, the fourth rotary element E4 drivingly coupled to the second rotary electric machine 12, and a sixth rotary element. That is, the differential gear device 6 (planetary gear device 60) may have six rotary elements as a whole. In this case, for example, the fifth rotary element may be fixed to the non-rotary member, and the sixth rotary element may be fixed to the non-rotary member.

Further, unlike the above embodiments in which the transmission device 2 includes the differential gear device 6, the transmission device 2 may be configured not to include the differential gear device 6. With this configuration, the power transmission path between the first rotary electric machine 11 and the first coupling member 51 and the power transmission path between the second rotary electric machine 12 and the second coupling member 52 can be separated. For example, the transmission device 2 may include a gear or a gear mechanism (a mechanism including a plurality of gears such as counter gear mechanisms; the same applies hereinafter) that couples the first drive gear 21a and the first driven gear 51a, and a gear or a gear mechanism that couples the second drive gear 22a and the second driven gear 52a. Alternatively, the first drive gear 21a may mesh with the first driven gear 51a, and the second drive gear 22a may mesh with the second driven gear 52a. In this case, the transmission device 2 includes at least a part of the first drive shaft D1 (e.g., the first drive member 21), and at least a part of the second drive shaft D2 (e.g., the second drive member 22).

(4) In the above embodiments, the branch portion 9, the first branch oil passage 93a, and the second branch oil passage 93b are formed at the positions overlapping the first oil passage 91 and the second oil passage 92 as viewed in the axial direction L. However, the present disclosure is not limited to this configuration. The branch portion 9 may be formed at a position not overlapping the first oil passage 91 or the second oil passage 92 as viewed in the axial direction L. That is, the branch portion 9 may be formed at a position different from the first oil passage 91 or the second oil passage 92, in the plane orthogonal to the axial direction L. Even in this case, the joining portion of the first branch oil passage 93a to the first oil passage 91 and the joining portion of the second branch oil passage 93b to the second oil passage 92 may be disposed at the positions overlapping the first oil passage 91 and the second oil passage 92 as viewed in the axial direction L. Thus, as in the above embodiments, the opening of the first branch oil passage 93a can be disposed inside the first oil passage 91, and the opening of the second branch oil passage 93b can be disposed inside the second oil passage 92.

(5) In the above embodiments, the distance in the axial direction L (first distance X1) from the branch portion 9 to the first rotary electric machine 11 and the distance in the axial direction L (second distance X2) from the branch portion 9 to the second rotary electric machine 12 are equal. However, the present disclosure is not limited to this configuration. The first distance X1 and the second distance X2 may be different.

(6) In the above embodiments, the first oil passage 91 is formed to have an inner diameter that increases in a stepwise manner toward the axial first side L1, and the second oil passage 92 is formed to have an inner diameter that increases in a stepwise manner toward the axial second side L2. However, the present disclosure is not limited to this configuration. For example, the first oil passage 91 may be formed to have a uniform inner diameter in the axial direction L, and the second oil passage 92 may be formed to have a uniform inner diameter in the axial direction L. Alternatively, the first oil passage 91 may have both a portion having an inner diameter that increases in a stepwise manner toward the axial first side L1 and a portion having an inner diameter that decreases in a stepwise manner toward the axial first side L1, and the second oil passage 92 may have both a portion having an inner diameter that increases in a stepwise manner toward the axial second side L2 and a portion having an inner diameter that decreases in a stepwise manner toward the axial second side L2.

(7) In the above embodiments, the intermediate wall is a member (specifically, the fifth case portion 35) forming the case 3. However, the present disclosure is not limited to this configuration. The intermediate wall may be a member (a separate member from the case 3) fixed to the case 3. That is, a member disposed inside the case 3 and fixed to the case 3, such as the support member 40 in the above embodiment, may be used as an intermediate wall. In this case, the joining portion between the intermediate wall and the case 3 is not exposed outside the case 3. Therefore, as in the above embodiments, even when this intermediate wall is disposed at the position in the axial direction L where the joining portion 36 between the first case portion 31 and the second case portion 32 is disposed, the first case portion 31 (first peripheral wall portion 31c) and the second case portion 32 (second peripheral wall portion 32c) are joined without the intermediate wall interposed therebetween.

(8) In the above embodiments, the first drive shaft D1 includes two shaft members coupled to each other (specifically, the first rotor shaft 11c and the first drive member 21), and the second drive shaft D2 includes two shaft members coupled to each other (specifically, the second rotor shaft 12c and the second drive member 22). However, the present disclosure is not limited to this configuration. One or or both the first drive shaft D1 and the second drive shaft D2 may include only one shaft member, or may include three or more shaft members coupled to each other. For example, the first drive shaft D1 may include only the first rotor shaft 11c, and the second drive shaft D2 may include only the second rotor shaft 12c.

(9) In the above embodiments, the first drive gear 21a meshes with the first input gear 71a, and the second drive gear 22a meshes with the second input gear 72a. However, the present disclosure is not limited to this configuration. The first drive gear 21a and the first input gear 71a may be coupled via another gear or a gear mechanism, and the second drive gear 22a and the second input gear 72a may be coupled via another gear or a gear mechanism.

(10) In the above embodiments, the first output gear 81a meshes with the first driven gear 51a, and the second output gear 82a meshes with the second driven gear 52a. However, the present disclosure is not limited to this configuration. The first output gear 81a and the first driven gear 51a may be coupled via another gear or a gear mechanism, and the second output gear 82a and the second driven gear 52a may be coupled via another gear or a gear mechanism.

(11) In the above embodiments, the differential gear device 6 is the planetary gear device 60. However, the present disclosure is not limited to this configuration. The differential gear device 6 may be a bevel gear type differential gear device. In this case, for example, combined torque obtained by combining the torque of the first rotary electric machine 11 and the torque of the second rotary electric machine 12 may be input to the transmission device 2, and the transmission device 2 may distribute the combined torque to the first coupling member 51 and the second coupling member 52.

(12) In the above embodiment, the transmission device 2 is disposed on the third axis A3 parallel to the first axis A1 and the second axis A2. However, the present disclosure is not limited to this configuration. The transmission device 2 may be disposed on the first axis A1 or the second axis A2.

(13) The features disclosed in any of the embodiments described above (including the embodiments described as other embodiments) may be applied in combination with the features disclosed in the other embodiments as long as no inconsistency arises. Regarding other features as well, the embodiments disclosed herein are merely examples in all respects. Accordingly, various modifications may be appropriately made without departing from the scope and spirit of the present disclosure.

Summary of Embodiments

The following provides a summary of the vehicle drive device described above.

A vehicle drive device (1) includes: a first rotary electric machine (11); a second rotary electric machine (12); a first coupling member (51) drivingly coupled to a first wheel (W1); a second coupling member (52) drivingly coupled to a second wheel (W2); a transmission device (2) that transmits torque of the first rotary electric machine (11) to at least the first coupling member (51) out of the first coupling member (51) and the second coupling member (52), and transmits torque of the second rotary electric machine (12) to at least the second coupling member (52) out of the first coupling member (51) and the second coupling member (52); and a case (3) that accommodates the first rotary electric machine (11), the second rotary electric machine (12), the first coupling member (51), the second coupling member (52), and the transmission device (2). Here, the first rotary electric machine (11) and the second rotary electric machine (12) are disposed in this order from an axial first side (L1) defining one side in an axial direction (L), on a first axis (A1); the first coupling member (51) and the second coupling member (52) are disposed on a second axis (A2) parallel to the first axis (A1); an intermediate wall (35) that is a member forming the case (3) or that is a member fixed to the case (3) is disposed to extend in a radial direction (R) with respect to the first axis (A1), between the first rotary electric machine (11) and the second rotary electric machine (12) in the axial direction (L); a first drive shaft (D1) that rotates with the first rotary electric machine (11) and a second drive shaft (D2) that rotates with the second rotary electric machine (12) are further disposed on the first axis (A1); an end of the first drive shaft (D1) on an axial second side (L2) opposite to the axial first side (L1) in the axial direction (L) is rotatably supported by the intermediate wall (35); an end of the second drive shaft (D2) on the axial first side (L1) is rotatably supported by the intermediate wall (35); a first oil passage (91) for supplying oil to the first rotary electric machine (11) is formed inside the first drive shaft (D1) in the axial direction (L); a second oil passage (92) for supplying oil to the second rotary electric machine (12) is formed inside the second drive shaft (D2) in the axial direction (L); a supply oil passage (93) to which oil is supplied from a hydraulic pressure source (5) is formed in the intermediate wall (35); and an end of the first oil passage (91) on the axial second side (L2) and an end of the second oil passage (92) on the axial first side (L1) are connected to the supply oil passage (93).

With this configuration, oil can be supplied from the supply oil passage (93) formed in the intermediate wall (35) to both the first oil passage (91) for supplying oil to the first rotary electric machine (11) and the second oil passage (92) for supplying oil to the second rotary electric machine (12). Accordingly, compared to the case where an oil passage for supplying oil to the first oil passage (91) and an oil passage for supplying oil to the second oil passage (92) are separately formed in the case (3) or the like (a member forming the case (3) or a member fixed to the case (3)), it is possible to appropriately supply oil to both the first rotary electric machine (11) and the second rotary electric machine (12) while reducing the man-hours required to process the case (3) or the like.

In the above configuration, it is preferable that the supply oil passage (93) be formed to split at a branch portion (9) into a first branch oil passage (93a) connected to the first oil passage (91), and a second branch oil passage (93b) connected to the second oil passage (92), and the branch portion (9), the first branch oil passage (93a), and the second branch oil passage (93b) be formed at positions overlapping the first oil passage (91) and the second oil passage (92) as viewed in the axial direction (L).

With this configuration, compared to the case where the branch portion (9) is disposed not to overlap the first oil passage (91) or the second oil passage (92) as viewed in the axial direction (L), the first branch oil passage (93a) and the second branch oil passage (93b) formed in the intermediate wall (5) may have a shape that is relatively easy to process, such as a linear shape extending in the axial direction (L). Accordingly, it is possible to reduce the manufacturing cost of the vehicle drive device (1).

In the configuration in which the supply oil passage (93) is formed to split at the branch portion (9) into the first branch oil passage (93a) and the second branch oil passage (93b) as described above, it is preferable that a distance (X1) in the axial direction (L) from the branch portion (9) to the first rotary electric machine (11) and a distance (X2) in the axial direction (L) from the branch portion (9) to the second rotary electric machine (12) be equal.

With this configuration, when the vehicle is moving straight, it is possible to reduce the imbalance between the amount of oil supplied to the first rotary electric machine (11) and the amount of oil supplied to the second rotary electric machine (12), and equally cool the first rotary electric machine (11) and the second rotary electric machine (12). Accordingly, although the output torque of a rotary electric machine is generally temperature dependent, since the first rotary electric machine (11) and the second rotary electric machine (12) can be equally cooled when the vehicle is traveling straight, it is easy to combine the output torque of the first rotary electric machine (11) and the second rotary electric machine (12) so as to achieve a stable straight movement of the vehicle.

In the vehicle drive device (1) having any of the above configurations, it is preferable that the first oil passage (91) be formed to have an inner diameter that increases in a stepwise manner toward the axial first side (L1), and the second oil passage (92) be formed to have an inner diameter that increases in a stepwise manner toward the axial second side (L2).

With this configuration, the oil pressed against the inner peripheral surface of the first oil passage (91) by the centrifugal force due to the rotation of the first drive shaft (D1) can be prevented from flowing to the axial second side (L2). This makes it easy to create a smooth flow of oil to the axial first side (L1) (that is, a smooth flow of oil toward the first rotary electric machine (11)) in the first oil passage (91). Likewise, the oil pressed against the inner peripheral surface of the second oil passage (92) by the centrifugal force due to the rotation of the second drive shaft (D2) can be prevented from flowing to the axial first side (L1). This makes it easy to create a smooth flow of oil to the axial second side (L2) (that is, a smooth flow of oil toward the second rotary electric machine (12)) in the second oil passage (92).

Further, it is preferable that the transmission device (2) include a planetary gear mechanism (61, 62) disposed on a third axis (A3) parallel to the first axis (A1) and the second axis (A2); and a third oil passage (95) for supplying oil to the planetary gear mechanism (61, 62) be formed inside a shaft member (63) disposed on the third axis (A3).

With this configuration, it is possible to increase the independence between supply of oil to the first rotary electric machine (11) and the second rotary electric machine (12) and supply of oil to the planetary gear mechanism (61, 62). This makes it possible to reduce the influence of the oil supply state to the planetary gear mechanism (61, 62) on the oil supply state to the first rotary electric machine (11) and the second rotary electric machine (12), thereby facilitating a stable supply of oil to the first rotary electric machine (11) and the second rotary electric machine (12).

The vehicle control device according to the present disclosure only needs to provide at least one of the above effects.

The invention claimed is:

1. A vehicle drive device comprising:
a first rotary electric machine;
a second rotary electric machine;
a first coupler drivingly coupled to a first wheel;
a second coupler drivingly coupled to a second wheel;
a transmission device that transmits torque of the first rotary electric machine to at least the first coupler out of the first coupler and the second coupler, and transmits torque of the second rotary electric machine to at least the second coupler out of the first coupler and the second coupler; and
a case that accommodates the first rotary electric machine, the second rotary electric machine, the first coupler, the second coupler, and the transmission device; wherein
the first rotary electric machine and the second rotary electric machine are disposed in this order from an axial first side defining one side in an axial direction, on a first axis;
the first coupler and the second coupler are disposed on a second axis parallel to the first axis,
an intermediate wall that is a member forming the case or that is a member fixed to the case is disposed to extend in a radial direction with respect to the first axis, between the first rotary electric machine and the second rotary electric machine in the axial direction,
a first drive shaft that rotates with the first rotary electric machine and a second drive shaft that rotates with the second rotary electric machine are further disposed on the first axis,
an end of the first drive shaft on an axial second side opposite to the axial first side in the axial direction is rotatably supported by the intermediate wall,
an end of the second drive shaft on the axial first side is rotatably supported by the intermediate wall,
a first oil passage for supplying oil to the first rotary electric machine is formed inside the first drive shaft in the axial direction,
a second oil passage for supplying oil to the second rotary electric machine is formed inside the second drive shaft in the axial direction,
a supply oil passage to which oil is supplied from a hydraulic pressure source is formed in the intermediate wall, and
an end of the first oil passage on the axial second side and an end of the second oil passage on the axial first side are connected to the supply oil passage.

2. The vehicle drive device according to claim 1, wherein
the supply oil passage is formed to split at a branch into a first branch oil passage connected to the first oil passage, and a second branch oil passage connected to the second oil passage, and
the branch, the first branch oil passage, and the second branch oil passage are formed at positions overlapping the first oil passage and the second oil passage as viewed in the axial direction.

3. The vehicle drive device according to claim 2, wherein a distance in the axial direction from the branch to the first rotary electric machine and a distance in the axial direction from the branch to the second rotary electric machine are equal.

4. The vehicle drive device according to claim 1, wherein
the first oil passage is formed to have an inner diameter that increases in a stepwise manner toward the axial first side, and
the second oil passage is formed to have an inner diameter that increases in a stepwise manner toward the axial second side.

5. The vehicle drive device according to claim 1, wherein
the transmission device includes a planetary gear mechanism disposed on a third axis parallel to the first axis and the second axis, and
a third oil passage for supplying oil to the planetary gear mechanism is formed inside a shaft member disposed on the third axis.

6. The vehicle drive device according to claim 2, wherein
the first oil passage is formed to have an inner diameter that increases in a stepwise manner toward the axial first side, and
the second oil passage is formed to have an inner diameter that increases in a stepwise manner toward the axial second side.

7. The vehicle drive device according to claim 3, wherein
the first oil passage is formed to have an inner diameter that increases in a stepwise manner toward the axial first side, and
the second oil passage is formed to have an inner diameter that increases in a stepwise manner toward the axial second side.

8. The vehicle drive device according to claim 6, wherein
the transmission device includes a planetary gear mechanism disposed on a third axis parallel to the first axis and the second axis, and
a third oil passage for supplying oil to the planetary gear mechanism is formed inside a shaft member disposed on the third axis.

9. The vehicle drive device according to claim 3, wherein
the transmission device includes a planetary gear mechanism disposed on a third axis parallel to the first axis and the second axis, and
a third oil passage for supplying oil to the planetary gear mechanism is formed inside a shaft member disposed on the third axis.

10. The vehicle drive device according to claim 4, wherein
the transmission device includes a planetary gear mechanism disposed on a third axis parallel to the first axis and the second axis, and
a third oil passage for supplying oil to the planetary gear mechanism is formed inside a shaft member disposed on the third axis.

11. The vehicle drive device according to claim 6, wherein
the transmission device includes a planetary gear mechanism disposed on a third axis parallel to the first axis and the second axis, and
a third oil passage for supplying oil to the planetary gear mechanism is formed inside a shaft member disposed on the third axis.

12. The vehicle drive device according to claim 7, wherein
the transmission device includes a planetary gear mechanism disposed on a third axis parallel to the first axis and the second axis, and
a third oil passage for supplying oil to the planetary gear mechanism is formed inside a shaft member disposed on the third axis.

* * * * *